United States Patent
Uyeki et al.

(10) Patent No.: US 10,336,206 B2
(45) Date of Patent: Jul. 2, 2019

(54) IDENTIFYING A USER OF A CHARGING STATION

(71) Applicants: Honda Motor Co., Ltd., Minato-ku, Tokyo (JP); IBM Corporation, Armonk, NY (US)

(72) Inventors: Robert Uyeki, Torrance, CA (US); Charles Bradford Vincent, Dallas, TX (US); Xiao Song Ran, Milpitas, CA (US); David Wong Cun, Fountain Valley, CA (US); Richard Asato, Torrance, CA (US); Thomas Clay Luthy, Alexandria, VA (US)

(73) Assignees: HONDA MOTOR CO., LTD., Tokyo (JP); IBM CORPORATION, Armonk, NY (US)

( * ) Notice: Subject to any disclaimer, the term of this patent is extended or adjusted under 35 U.S.C. 154(b) by 398 days.

(21) Appl. No.: 14/748,468

(22) Filed: Jun. 24, 2015

(65) Prior Publication Data

US 2016/0375783 A1 Dec. 29, 2016

(51) Int. Cl.

| | |
|---|---|
| *B60L 53/14* | (2019.01) |
| *B60L 53/63* | (2019.01) |
| *B60L 53/65* | (2019.01) |
| *B60L 53/66* | (2019.01) |
| *B60L 53/30* | (2019.01) |
| *G06Q 50/06* | (2012.01) |
| *B60L 11/18* | (2006.01) |

(52) U.S. Cl.
CPC ........... *B60L 11/1846* (2013.01); *B60L 53/14* (2019.02); *B60L 53/305* (2019.02); *B60L 53/63* (2019.02); *B60L 53/65* (2019.02); *B60L 53/665* (2019.02); *B60L 2240/72* (2013.01); *G06Q 50/06* (2013.01); *Y02E 60/721* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(58) Field of Classification Search
None
See application file for complete search history.

(56) References Cited

U.S. PATENT DOCUMENTS

| | | | |
|---|---|---|---|
| 8,421,592 B1 * | 4/2013 | Gunasekara | ............ H04L 63/18 340/5.74 |
| 9,396,462 B2 * | 7/2016 | Littrell | ....................... B60L 3/12 |

(Continued)

*Primary Examiner* — Allen C Chein
(74) *Attorney, Agent, or Firm* — Arent Fox LLP

(57) ABSTRACT

Systems, methods, and other embodiments associated with identifying a user of a charging station. According to one embodiment, a system includes a communication logic and an authorization logic. The communication logic aggregates transaction data to an authorizing entity. The transaction data is associated with a user and a chargeable vehicle. The authorization logic receives an authorization request to authorize a transaction between the chargeable vehicle and the charging station. The authorization logic sends a response to the authorization request. The communication also enables the chargeable vehicle to receive a charge from the charging station based on the response to the authorization request.

19 Claims, 8 Drawing Sheets

(56) References Cited

U.S. PATENT DOCUMENTS

| | | | |
|---|---|---|---|
| 2004/0078340 A1* | 4/2004 | Evans | G06Q 20/10 |
| | | | 705/64 |
| 2004/0236681 A1* | 11/2004 | Modigliani | G06Q 20/02 |
| | | | 705/39 |
| 2012/0262112 A1* | 10/2012 | Ross | H02J 7/0042 |
| | | | 320/109 |
| 2014/0358749 A1* | 12/2014 | Williams | G06Q 30/04 |
| | | | 705/34 |
| 2015/0266379 A1* | 9/2015 | Bellin | B60K 35/00 |
| | | | 701/36 |

* cited by examiner

IDENTIFYING A USER OF A CHARGING STATION

BACKGROUND

Generally, a charging station (also known as an electric vehicle charging station, electric recharging point, charging point, electric vehicle supply equipment (EVSE), etc.) includes units capable of supplying electric energy for the recharging of chargeable electric vehicles. Charging stations may be an element in a public infrastructure for use by members of the public for a fee. The fee is typically determined by the amount of electricity consumed during recharging. To ensure effective billing, a charging station may require that users and the users' billing information be identified in advance. For example, use of a charging station may be predicated on pre-registration, issuance of Radio Frequency Identification (RFID) membership cards, etc.). Because charging stations may be made by various manufactures and maintained by assorted entities, user may have to maintain a number of registration, RFID membership cards, etc. to access different charging stations.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

As discussed above, to access different charging stations users may have to maintain multiple access tools, such as numerous forms of registration, RFID membership cards, etc. One or more embodiments of techniques or systems for identifying charging station users are provided herein. Identifying charging station users utilizes existing telematics, so that users do not have to maintain multiple access tools. Moreover, by using existing telematics, the process of accessing charging stations can be automated such that user intervention is not required. The telematics can also be utilized to save bandwidth when communicating with an authorizing entity.

Consider a user whom operates a chargeable vehicle that the user wishes to charge using a charging station. The user queries a system to determine whether there are any charging stations available. In response to the user's query, the system may generate a list of available charging stations within a predetermined radius. Upon selecting a charging station from the list, the user receives driving directions from the position of the chargeable vehicle to the charging station.

In order to bill the user for charging the chargeable vehicle at a charging station, an authorizing entity authorizes billing. However, the specific charging station used may be unknown. For example, the charging station that the user intended to use may have been in use by another vehicle causing the user to select a different charging station. Transaction data that can be used to identify the charging station being used and the user is aggregated. To identify the charging station the one or more factors of the transaction data may be used, such as last known location, time and date of charge, and/or amount of charge received. In the event that the charging station cannot be identified, the most likely charging station may be identified.

Transaction data is also sent to the authorizing entity. The authorizing entity identifies the user. Accordingly, based on the transaction data an authorization request is sent to the user. The user may receive the authorization request via Short Message Service (SMS) text. If the user authorizes the transaction, the chargeable vehicle is enabled such that the chargeable vehicle may receive a charge from the charging station, the user may receive a bill for charging the chargeable vehicle, or the user may receive a receipt of payment for charging the chargeable vehicle.

The following description and drawings set forth certain illustrative aspects and implementations. These are indicative of but a few of the various ways in which one or more aspects may be employed. Other aspects, advantages, or novel features of the disclosure will become apparent from the following detailed description when considered in conjunction with the drawings.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
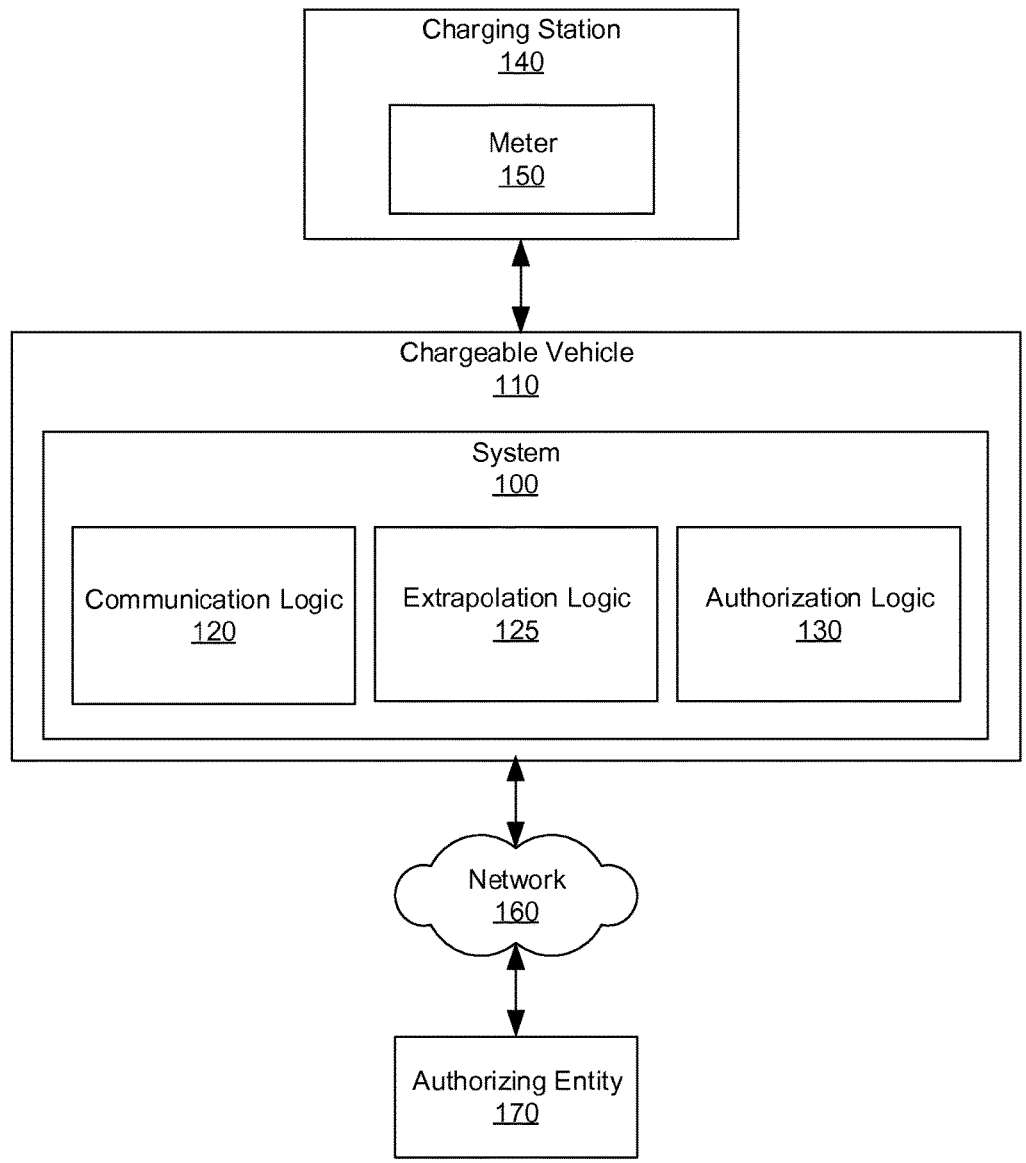
FIG. 1 illustrates one embodiment of an illustrative system associated with identifying charging station users according to one aspect of the present disclosure.

Embodiments or examples illustrated in the drawings are disclosed below using specific language. It will nevertheless be understood that the embodiments or examples are not intended to be limiting. Any alterations and modifications in the disclosed embodiments and any further applications of the principles disclosed in this document are contemplated as would normally occur to one of ordinary skill in the pertinent art. Described herein are examples of systems, methods, and other embodiments associated with identifying charging station users.

FIG. 1 is an illustration of an example system 100 associated with identifying charging station users. In one embodiment, the system 100 is implemented in a chargeable vehicle 110 such as a plug-in vehicle or a vehicle capable of wireless charging. In one embodiment, the system 100 may be implemented as an application, or "app," implemented with the chargeable vehicle 110. For example, the system 100 may be accessible as an app using a display screen in the chargeable vehicle 110. In this manner, the system 100 may utilize elements already present in the chargeable vehicle 110. For example, the systems, methods, and embodiments related to identifying charging station users may be a secondary functionality of the components. Thus, identifying charging station users may be an additional functionality of existing components.

The system 100 includes a communication logic 120, an extrapolation logic 125, and an authorization logic 130. As discussed above, the system 100 may be implemented in a chargeable vehicle 110. Accordingly, the system 100 includes an operable connection to a charging station 140. In one embodiment, the charging station is electric vehicle supply equipment. The charging station 140 includes a meter 150 to monitor the amount of electricity consumed by the chargeable vehicle 110.

In one embodiment, the chargeable vehicle 110 arrives at the charging station 140 and receives a charge. The communication logic 120 uses a network 160 to send transaction data to an authorizing entity 170. The transaction data may include the last known vehicle data before the vehicle is turned off. For example, the transaction data may include many factors regarding both a user of the chargeable vehicle 110 and the chargeable vehicle 110 itself. For example, the factors of the transaction data may include date and time information, latitude and longitude, vehicle identification number (VIN), make and model, license plate information, registration information, year of manufacture, etc. The transaction data may also include the amount of charge received by the chargeable vehicle. The network 160 may be a telematics network capable of utilizing components, such as a telematics system, of the chargeable vehicle 110. For example, the network 160 include a Bluetooth® network, global positioning system, internet WiFi, and other forms of computer communication.

The transaction data may also include an approximated identity of the charging station 140. The extrapolation logic 125 may extrapolate the identity of the charging station 140 based on the transaction data. Consider that the charging station 140 is in an underground parking garage in which it is not possible to receive location data, such as a global positioning system signal. When the car enters the garage, the last known location data includes the address of the garage. In one example, the extrapolation logic 125 uses the location data to approximately identify the charging station 140. For example, the closest charging station to the last known location of the chargeable vehicle may be deemed the charging station 140. Accordingly, the identity of the charging station 140 can be extrapolated by the extrapolation logic 125 from the transaction data.

In another embodiment, the extrapolation logic 125 may use multiple factors of the transaction data to identify the charging station 140. For example, suppose that there are a cluster of charging station proximate to the chargeable vehicle 110. In addition to location information, the extrapolation logic 125 may use the amount of charge received by the chargeable vehicle as compared to the amount of charge dispensed by each of the charging stations in the cluster within the time frame that the chargeable vehicle 110 was being charged. The extrapolation logic 125 identifies the charging station having dispensed a corresponding amount of charge as the charging station 140. To compare or confirm the transaction data the extrapolation logic 125 may request information from charging stations, the authorizing entity 170, or other third party entity. Accordingly, the extrapolation logic 125 may use one or more factors of the transaction data to identify the charging station 140.

The authorizing entity 170 uses the transaction data to identify the user of the chargeable vehicle 110 and authorize the identified user. For example, the authorizing entity may store data associated with users of chargeable vehicles. Specifically, the authorizing entity 170 may store contact information for the users. The contact information can be used to send an authorization request to a user based on the transaction data. In one embodiment, the authorizing entity 170 may compare the transaction data to authorization data stored by the authorizing entity 170. A user is identified by comparing the transaction data to the authorizing data. A user may be identified when a specified number of values in the transaction data match values of the authorization data. Alternatively, a user may be identified when a specific value of the transaction data matches a value of the authorization data. Once a user is identified, the authorizing entity sends an authorization request to the user based on the contact information associated with the authorization data matched to the transaction data.

The authorization logic 130 receives the authorization request from the authorizing entity 170. The authorization request indicates that a chargeable vehicle 110 associated with the user has been identified for attempt to access a charging station. In one embodiment, the authorization request states that the chargeable vehicle 110 that is associated with a particular user has been identified as attempting to access a charging station 140. Additionally or alternatively, the authorization request includes a request that the user input a value to affirm access. For example, the authorization request may include a one-time password (OTP) with which the user is requested to respond to the authorization request. Alternatively, the authorization request may have an embedded selectable response to either affirm or negate the access. In this manner, the authorization entity 170 requests authorization for the chargeable vehicle 110 to access the charging station 140. A response to the authorization request can be issued using the authorization logic 130. In response to authorization being granted, the communication logic 120 enables the chargeable vehicle 110 to receive a charge.

Figure 2:
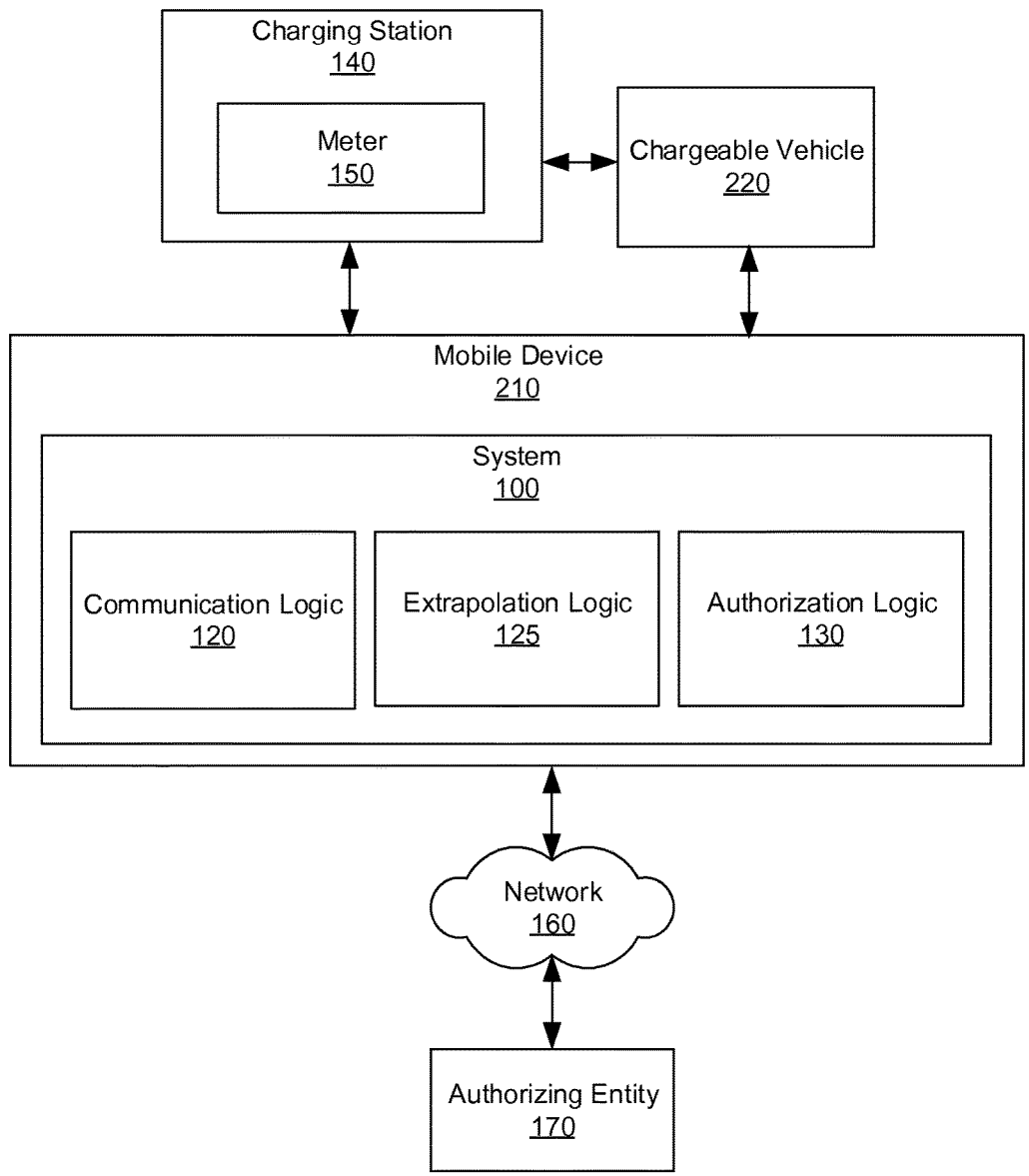
FIG. 2 illustrates one embodiment of an illustrative system using a mobile device associated with identifying charging station users according to one aspect of the present disclosure.

FIG. 2 illustrates one embodiment of a system associated with identifying charging station users. The system 100, the communication logic 120, the extrapolation logic 125, the authorization logic 130, the charging station 140, the meter 150, the network 160, and the authorizing entity 170 operate in a similar manner as described above with respect to FIG. 1. However, in FIG. 2, the system 100 is implemented in a mobile device 210 rather than directly in a chargeable vehicle 220. The mobile device 210 may be a portable computing device, a smart phone, a tablet computer, a laptop, a wearable device, personal digital assistant, and so on.

The system 100 may be an application that is downloadable to the mobile device 210 of the user. The downloaded app may be synchronized such that is able to operate in conjunction with the chargeable vehicle 220. For example, the application may be synched using a telematics network of the chargeable vehicle 220, such as a Bluetooth® network. Using an operable connection between the mobile device 210 and the chargeable vehicle 220, the system 100 is able to communicate with the charging station 140, the authorizing entity 170, and the chargeable vehicle 220 in the manner described above with respect to FIG. 1.

Figure 3:
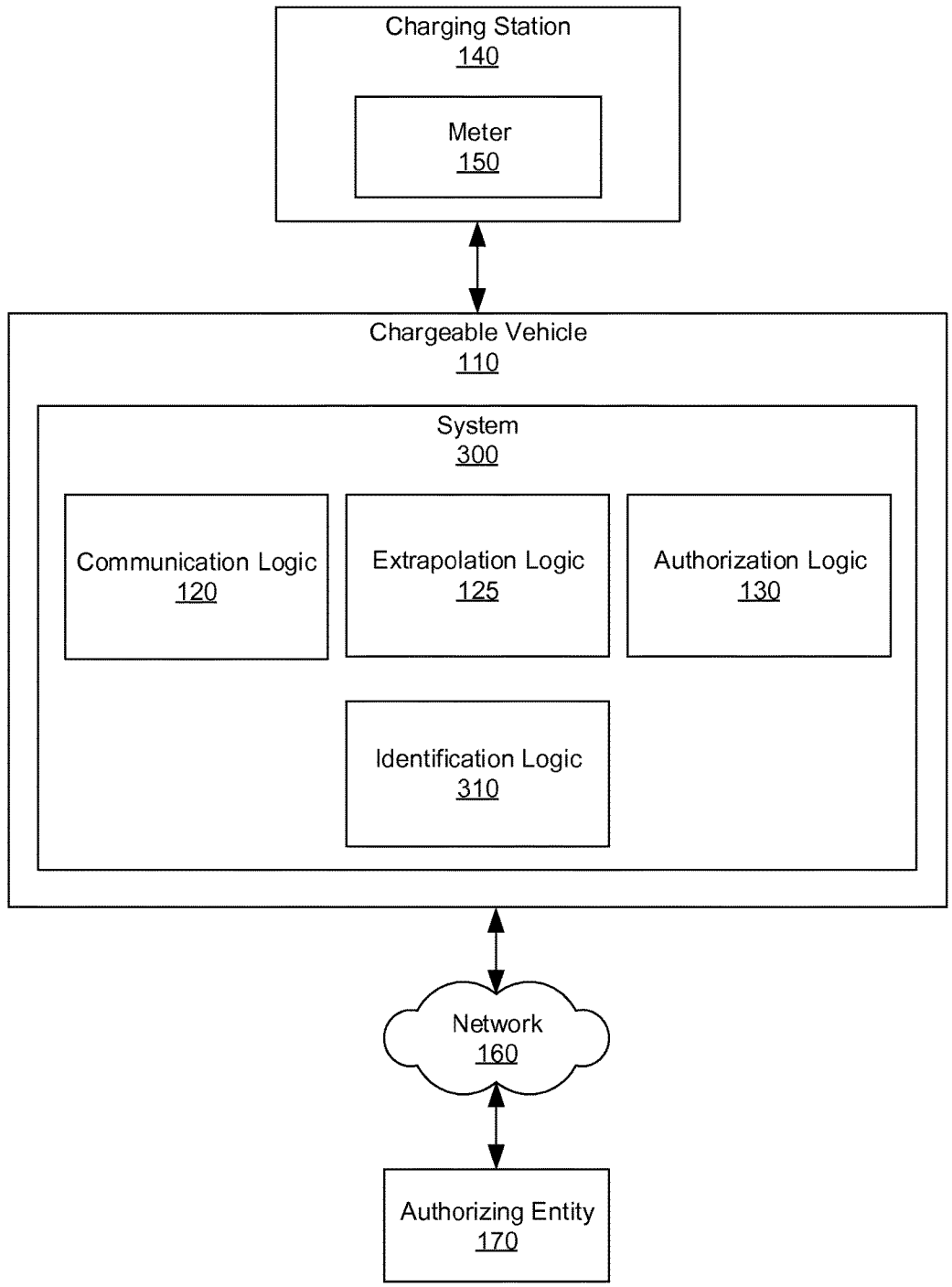
FIG. 3 illustrates another embodiment of an illustrative system having an identification logic associated with identifying charging station users according to one aspect of the present disclosure.

FIG. 3 illustrates another embodiment of a system 300 having an identification logic 310 associated with identifying charging station users. The system 300 operates in a similar manner as the system 100 described with respect to FIG. 1. The chargeable vehicle 110, the communication logic 120, the extrapolation logic 125, the authorization logic 130, the charging station 140, the meter 150, the network 160, and the authorizing entity 170 operate in a similar manner as described above with respect to FIG. 1. The system 300 also includes an identification logic 310.

The identification logic 310 identifies charging stations prior to charging based on user criteria such as location, compatibility, availability, fee-structure, and so on. In one embodiment, a user can query the system 300 to determine whether there are any local charging stations that are compatible with the chargeable vehicle 110. The identification logic 310 then returns a listing of local charging stations. For example, a chargeable vehicle 110 may have specific power requirements to receive a charge. Suppose that the chargeable vehicle requires power at a specific voltage. The identification logic 310 may search for charging stations that meet the specific power requirements, such as defined voltage. In this manner, the system 300 can locate charging stations that meet one or more of the power requirements of the chargeable vehicle 110.

The identification logic 310 can also identify charging stations that are available. For example, the charging station 140 may emit signals that indicate whether the charging station 140 is able to charge. For example, the charging station may be deemed unavailable if the charging station 140 is being used by another, is un-operational, etc. Accordingly, the charging station 140 may emit a signal indicating that the charging station 140 is unavailable. Conversely, if the charging station 140 is available to charge the chargeable vehicle 110, a signal may be emitted indicating the charging station 140 is available. In addition to compatibility and availability, the identification logic 310 may identify charging stations based on a number of other parameters. For example, the identification logic 310 may identify charging stations based on whether a charging station is free or fee based.

The identification logic 130 may also sort the list based on a desired parameter. For example, some charging stations may have time limits associated with the amount of time the chargeable vehicle 110 can be connected to the charging station 140. Therefore, the identification logic 310 may sort the charging stations based on the charging time from longest to shortest. Alternatively, the identification logic 310 may sort charging stations based on the distance to the charging stations from the chargeable vehicle 110.

In one embodiment, the identification logic 310 generates a listing of the charging stations that meet the requested parameters. In another embodiment, the identification logic 310 generates a map illustrating the locations of the identified charging stations. The identification logic 310 receives a selection of a chosen charging station, such as charging station 140, from the user. In response to receiving the selections, the identification logic 310 may map a route from the present location of the chargeable vehicle 110 to the selected charging station 140. In this manner the identification logic 310 may provide directions to the charging station 140.

Figure 4:
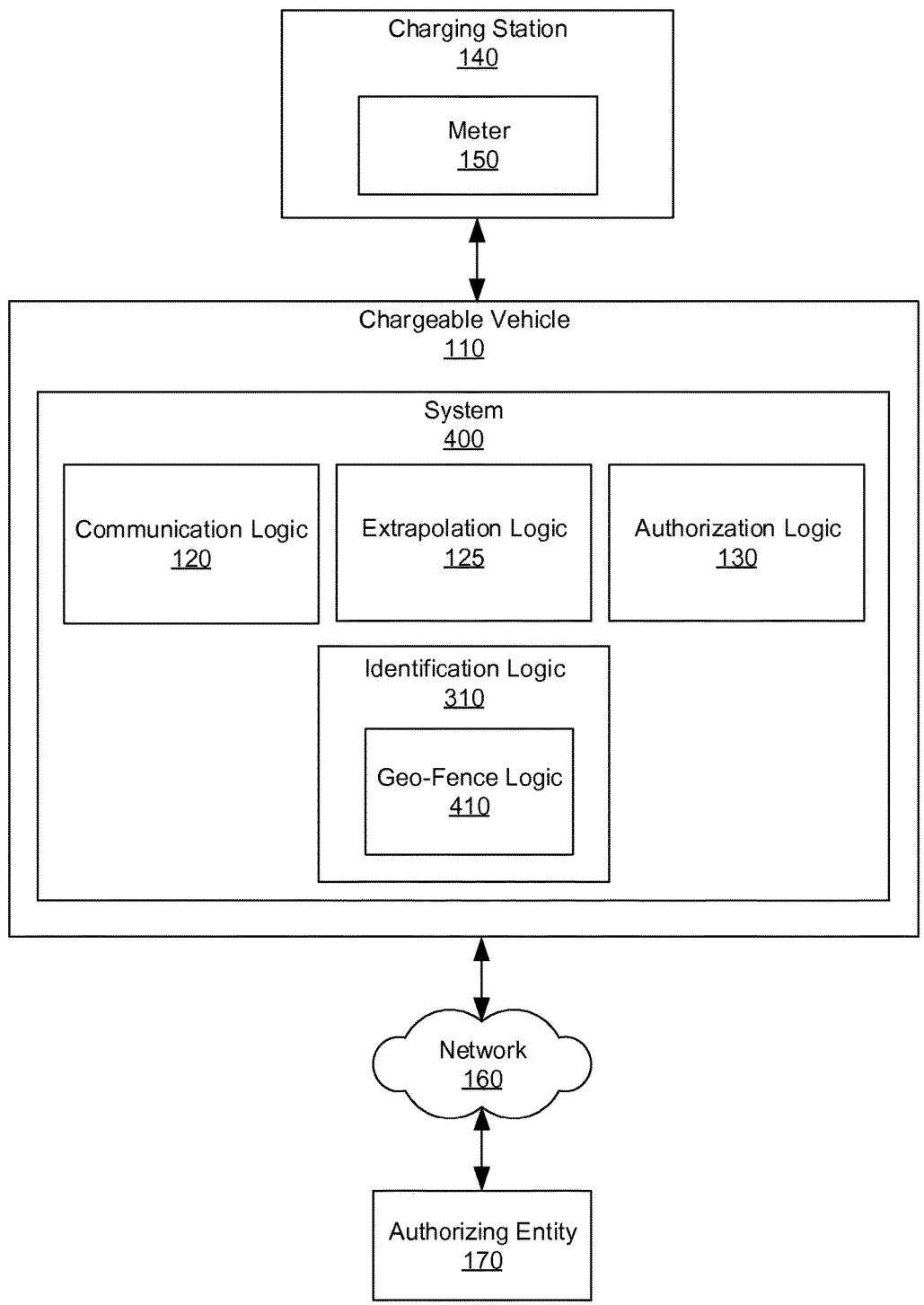
FIG. 4 illustrates another embodiment of an illustrative system having an identification logic with a Geo-Fence logic associated with identifying charging station users according to one aspect of the present disclosure.

FIG. 4 illustrates another embodiment of a system 400 having an identification logic 310 with a Geo-Fence logic 410 associated with identifying charging station users. The system 400 operates in a similar manner as the system 100 described with respect to FIG. 1. Accordingly, the chargeable vehicle 110, the communication logic 120, the authorization logic 130, the charging station 140, the meter 150, the network 160, and the authorizing entity 170 operate in a similar manner as described above with respect to FIG. 1. The identification logic 310 operates in a similar manner as described above with respect above with respect to FIG. 3. The identification logic 310 includes a Geo-Fence logic 410.

The Geo-Fence logic 410 defines a geographical area for the identification logic to operate within. For example, when a user queries an identification logic 310 to identify charging stations. The identification logic 310 may identify charging stations within the geographical area defined by Geo-Fence logic 410. In one embodiment, the Geo-Fence logic 410 may define an area using a radius from a predetermined point such as the location of the chargeable vehicle 110. Alternatively, the Geo-Fence logic 410 may define an area as a neighborhood, county, township, city, etc.

The Geo-Fence logic 410 may also define a localized region around the chargeable vehicle 110. A localized area around the chargeable vehicle 110 may limit communications to a specific charging station, such as charging station 140. Consider that a group of charging stations may be clustered together. To avoid communications between mismatched chargeable vehicles and charging stations, the Geo-Fence logic 410 may define a localized area such that the chargeable vehicle 110 is paired to the charging station 140 from which the chargeable vehicle is receiving a charge.

Figure 5:
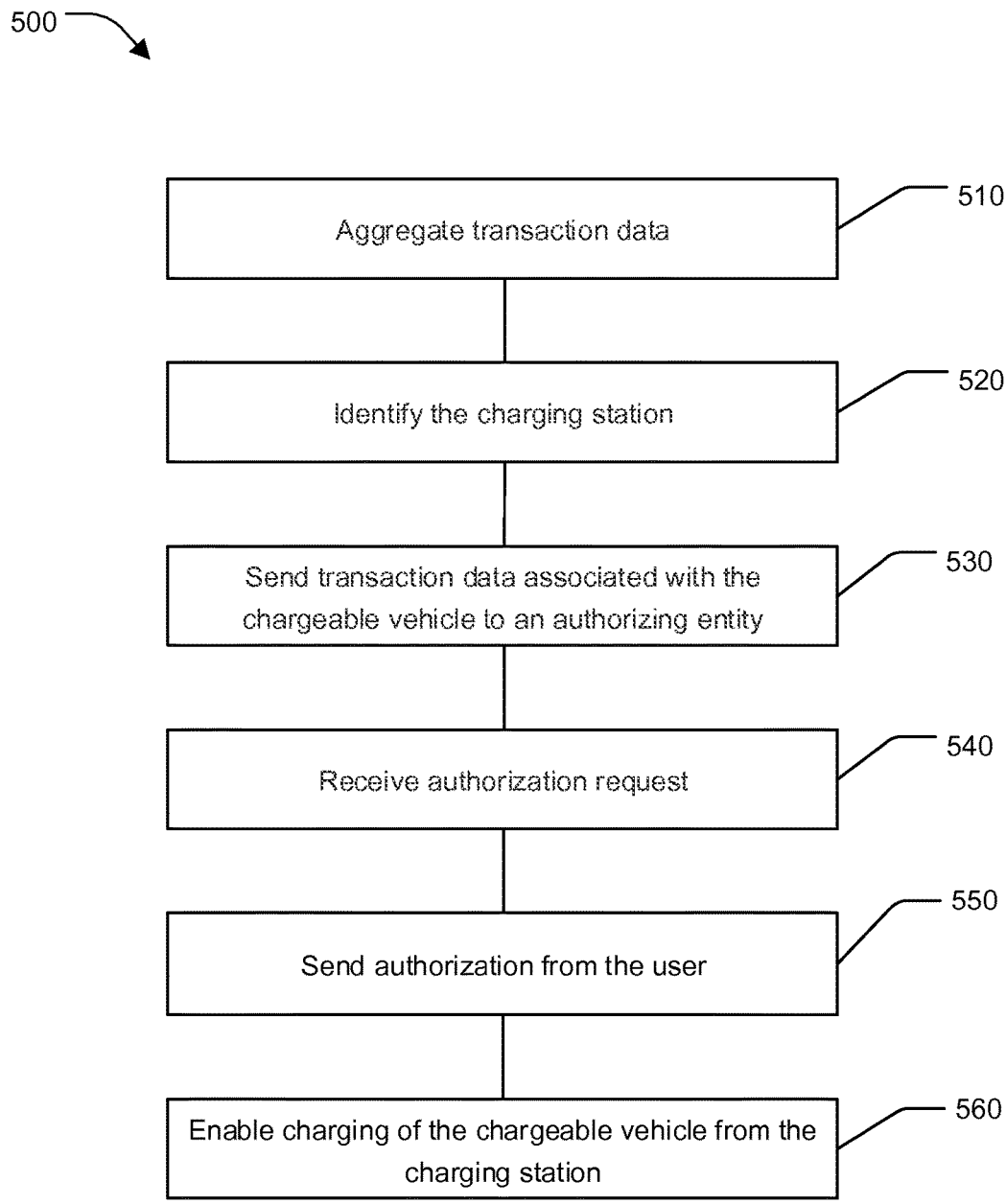
FIG. 5 illustrates one embodiment of an illustrative method associated with identifying charging station users according to one aspect of the present disclosure.

FIG. 5 illustrates one embodiment of a method associated with identifying charging station users. At 510, transaction data is aggregated. The transaction data may include information such as a location data, time and date information, chargeable vehicle specification information and so on. The transaction date may be aggregated from the chargeable vehicle itself, a mobile device having an operable connection to the chargeable vehicle, third party networks, etc. At 520, a charging station for charging the chargeable vehicle is identified. The charging station is identified based on the transaction data. For example, the charging station may be identified based on the proximity of the chargeable vehicle to the charging station. Additionally or alternatively, the charging station may be identified based on the time the charge was received by the chargeable vehicle, the amount of charge received by the chargeable vehicle, and/or the charging station selected by the user.

At 530, the transaction data associated with charging a chargeable vehicle at a charging station is sent to an authorizing entity. The authorizing entity may be a database storing information about a user associated with the chargeable vehicle. The chargeable vehicle may be identified using a unique identifier, such as a VIN. Based on the transaction data, the authorizing entity can identify contact information for the user of the chargeable vehicle. Accordingly, at 540 a request to authorize the transaction associated with the transaction data is received. As discussed above, the authorization request may request that a user respond with information unique to the user. Additionally or alternatively, the authorization request may request that the user respond with confidential information stored in the database. For example, the authorization request may request that a user respond with a password.

At 550, the user responds to the authorization request in order to authorize the transaction between the chargeable vehicle and the charging station. In one embodiment, the response to the authorization request affirms that the user is aware that the chargeable vehicle may receive a charge from the charging station and that the user accepts charges associated with charging the chargeable vehicle.

Figure 6:
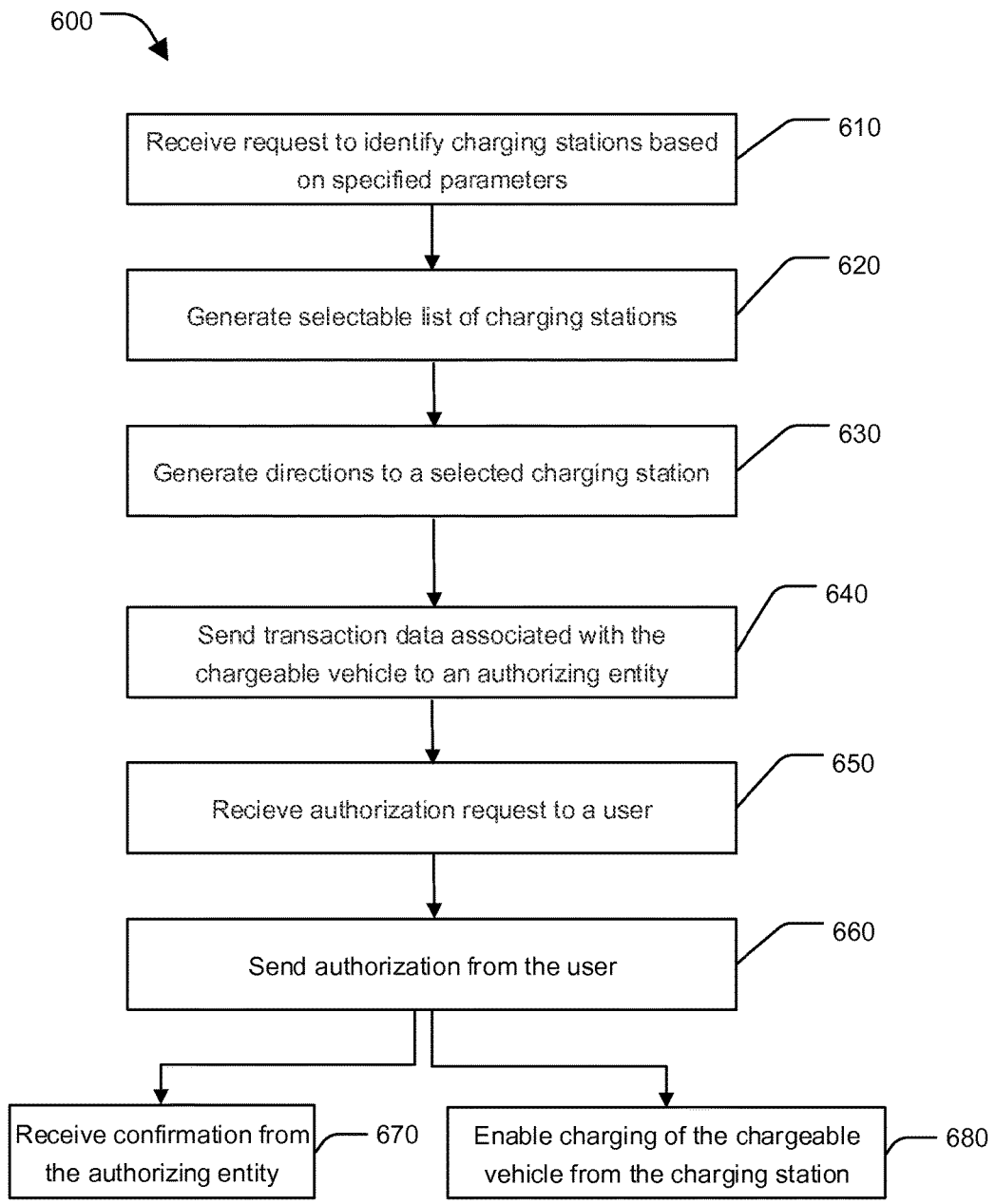
FIG. 6 illustrates one embodiment of an illustrative method associated with identifying charging station users according to one aspect of the present disclosure.

FIG. 6 illustrates one embodiment of a method associated with identifying charging station users including identifying charging stations. At 610, a request to identify charging stations based on parameters is received. For example, a user may request a listing of local charging stations that have a fee below a specified amount. At 620, a listing of charging stations conforming to the parameters specified by the user is provided. The listing of charging station is selectable such that a user can select a charging station from the generated list.

At 630, in response to the user selecting a charging station from the listing of charging stations, directions to the selected charging station are generated. In one embodiment, the listing of charging station is visually represented as a map. When the user selects a charging station on the map, the onboard global positioning system of the chargeable vehicle is employed to calculate directions from the position of the chargeable vehicle to the selected charging station.

At 640, transaction data is sent to the authorizing entity. The transaction data may be sent in response to a triggering event. In one embodiment, the triggering event may be based on the manner of connection between the chargeable vehicle and the charging station. For example, the triggering event may be when the chargeable vehicle is connected to the charging station. Additionally or alternatively, the triggering event may be when the chargeable vehicle is within a predetermined proximity of the charging station. Accordingly, a triggering event to send transaction data may be based on one or more factors of the chargeable vehicle and/or the charging station.

At 650 and authorization request associated with the transaction data is received. At 660, a response to the authorization request is sent to the authorizing entity. At 670 confirmation of the response to the authorization, request is received. The confirmation may be information regarding the charging station. For example, the confirmation may include pricing information for the charging station. Alternatively, the confirmation may be an invoice sent to the user once the transaction between the chargeable vehicle and the charging station is complete. At 680, the chargeable vehicle is enabled to receive a charge from the charging station.

Figure 7:
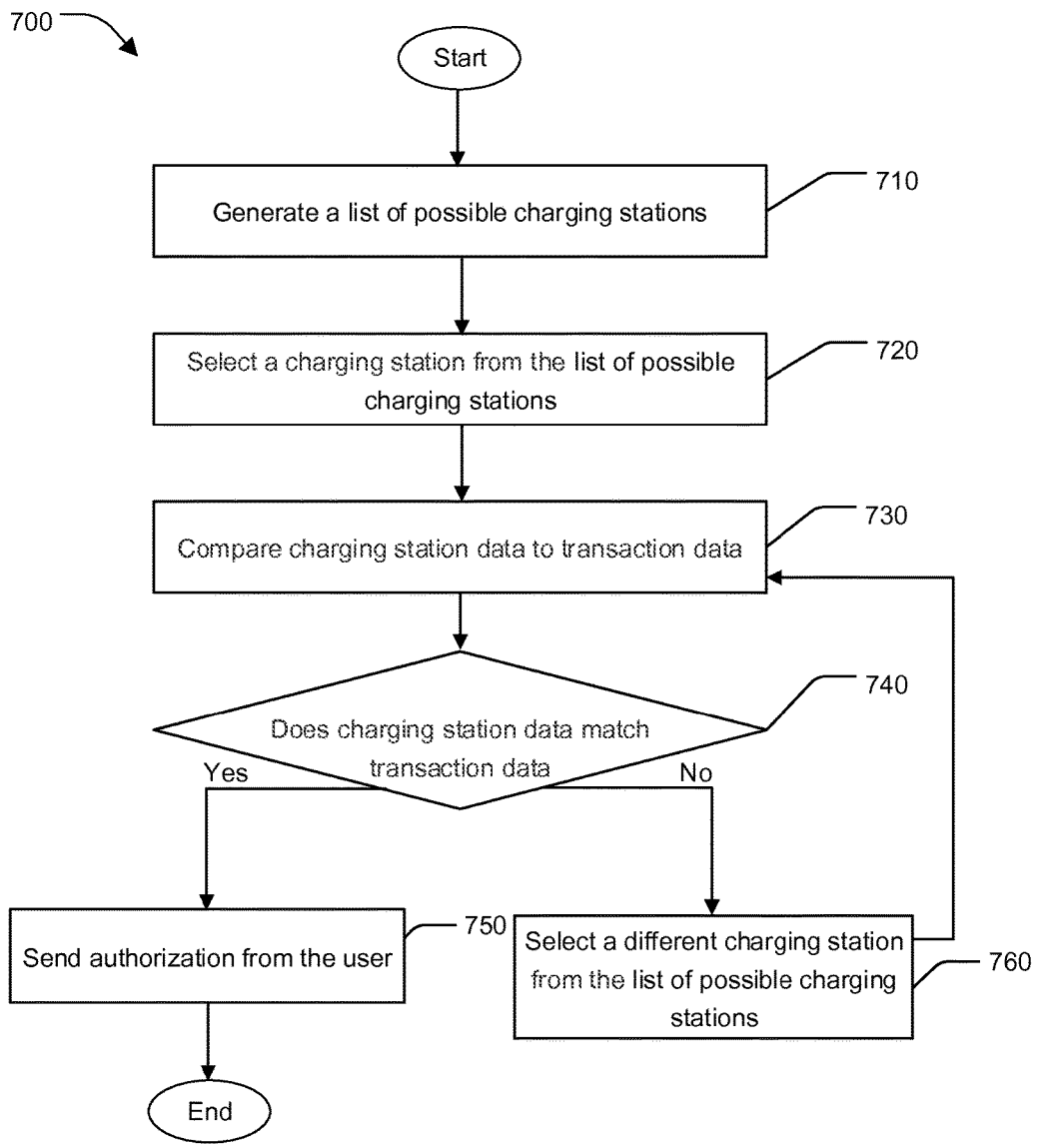
FIG. 7 illustrates one embodiment of an illustrative method associated with identifying a charging station and a charging station user according to one aspect of the present disclosure.

FIG. 7 illustrates one embodiment of a method associated with identifying a charging station and a charging station user. At 710, a list of possible charging stations is generated based on at least one factor of transaction data. For example, the list of possible charging stations may be based on proximity to a chargeable vehicle such that all charging stations within 500 yards of the chargeable vehicle are listed. Accordingly, if there is a grouping of charging stations each of the charging stations is listed. Suppose that the user receives directions to a specified charging station. The user may drive to that charging station and find that the charging station is unavailable. Accordingly, it is prudent not to assume that the chargeable vehicle is charged at a charging station just because it was selected by the user. Instead, nearby charging stations are listed with the selected charging station on the list of possible charging stations.

At 720, a charging station is selected from the list of possible charging stations. At 730, data associated with the selected charging station is compared to the transaction data. For example, the transaction data may include a factor detailing the amount of charge received by the chargeable vehicle. The charging station data may record the amount of charge dispensed to a chargeable vehicle in transaction. Accordingly, the transaction data is compared to corresponding charging station data.

In another example, the transaction data includes factors related to date and time. For example, the data and time a charge is initiated may be recorded, the data and time a charge is terminated may be recorded, and/or the date and duration of a charging transaction may be recorded. Likewise, the charging station data may also record these types of date and time information. Accordingly, corresponding date and time information from both the charging station and the transaction data may be compared.

At 740, it is determined whether the charging station matches the transaction data. The matching may not be an exact match. Instead, the values for the transaction data and the charging station data may match to a predetermined degree of certainty. For example, as discussed above the transaction data and the charging station data may be compared in terms of the amount of charge received and dispensed. A match between the charging station data and transaction data may be within a predetermined number of Kilowatt hours (kWh), such as 2 kWh. For example, suppose that the transaction data shows that the chargeable vehicle consumed 34 kWh and the charging station data shows 35.2 kWh. In this example, the transaction data would still be determined to match the charging data.

If at 740, it is determined that the transaction data matches the charging station data, the method continues to 750. At 750, an authorization request is sent to the user in a similar manner as described above with respect to FIG. 5. The request may be in the form of an invoice for charges to the user based on the amount of kWh consumed by the chargeable vehicle. If instead at 740, it is determined that the transaction data does not match the charging station data, the method continues to 760. At 760, a different charging station from the list of possible charging stations is selected. The different charging station would not have been previously selected. The method then returns to 730. At 730, the transaction data is compared to charging station data of the different charging station. The method 700 continues comparing the transaction data to the charging station data for each charging station on the list of possible charging stations until a charging station data matches the transaction data such that an authorization request can be generated at 750.

Figure 8:
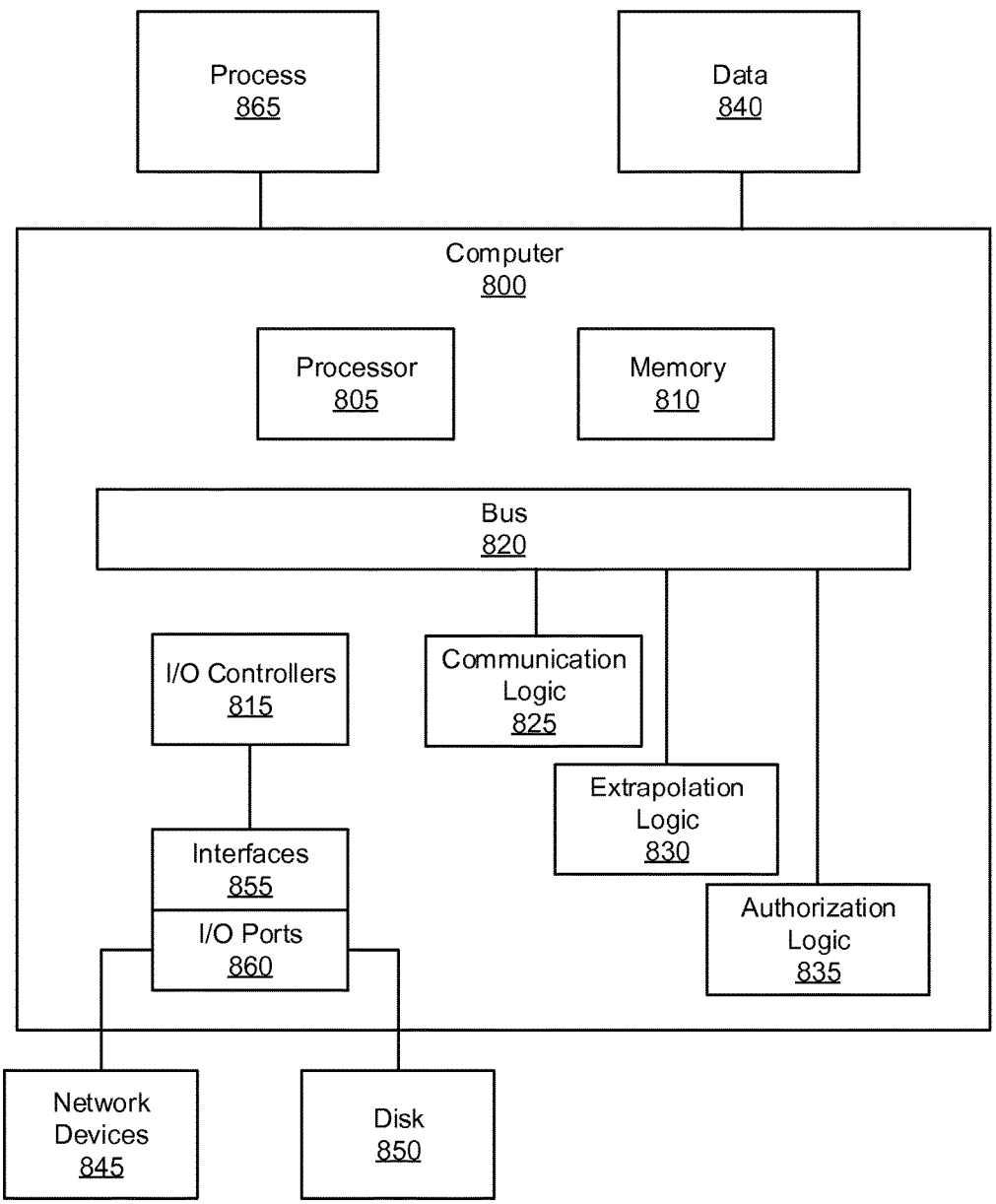
FIG. 8 illustrates one embodiment of an example computer environment associated with identifying charging station users according to one aspect of the present disclosure.

FIG. 8 illustrates one embodiment of an example computer environment associated with identifying charging station users. The computer environment in which the systems and methods described herein, and equivalents, may operate may include a computer 800. The computer includes a processor 805, a memory 810, and input/output (I/O) ports 815 operably connected by a bus 820. In one example, the computer 800 may include a communication logic 825, an extrapolation logic 830, and an authorization logic 835.

The communication logic 825 establishes communication between a system for identifying a user and an authorizing entity. The communication logic 825 may also establish communication between the user, the authorizing entity, a chargeable vehicle, and a charging station. For example, the communication logic may send transaction data from the user and the chargeable vehicle to an authorizing entity. The extrapolation logic 830 identifies a charging station using the transaction data. For example, the extrapolate logic 830 generate a list of possible charging stations based on proximity to the chargeable vehicle and select a charging station from the list. The charging station may be selected based on the amount of charge the chargeable vehicle received in comparison to the amount of charge each charging station on the list dispensed. The authorization logic 835 receives confirmation that a user has the authority to affirm a transaction between a chargeable vehicle and a charging station. For example, the authorization logic 835 may receive and authorization request and send a response based on user input.

In different examples, the communication logic 825, the extrapolation logic 830, and the authorization logic 835 may be implemented in hardware, a non-transitory computer-readable medium with stored instructions, firmware, and/or combinations thereof. While the communication logic 825, the extrapolation logic 830, and the authorization logic 835 are illustrated as hardware components attached to the bus 820, it is to be appreciated that in one example, the communication logic 825, the extrapolation logic 830, and the authorization logic 835 could be implemented in the processor 805.

In one embodiment, the communication logic 825 is a means (e.g., hardware, non-transitory computer-readable medium, firmware) for communicating between the user, the authorizing entity, the chargeable vehicle, and/or the charging station. Specifically, the communication logic 825 is a means for aggregating transaction data and sending the transaction data to the authorizing entity. The extrapolation logic 830 is a means for identifying a charging station using the transaction data. For example, the extrapolate logic 830 is a means for generating a list of possible charging stations based on proximity to the chargeable vehicle and selecting a charging station from the list. In one embodiment, the extrapolation logic 830 is also a means for comparing an amount of charge that the chargeable vehicle receives to the amount of charge each charging station on the list dispensed. The selection by the extrapolation logic 830 may then be based on the comparison. The authorization logic 835 is a means (e.g., hardware, non-transitory computer-readable medium, firmware) for affirming authorization of a transaction between a chargeable vehicle and charging station.

Generally describing an example configuration of the computer 800, the processor 805 may be a variety of various processors including dual microprocessor and other multi-processor architectures. The memory 810 may include volatile memory and/or non-volatile memory. Non-volatile memory may include, for example, ROM, PROM, and so on. Volatile memory may include, for example, RAM, SRAM, DRAM, and so on.

Network device 845 and a disk 850 may be operably connected to the computer 800 via, for example, an I/O interfaces (e.g., card, device) 855 and an I/O ports 860. The disk 845 may be, for example, a magnetic disk drive, a solid state disk drive, a floppy disk drive, a tape drive, a Zip drive, a flash memory card, a memory stick, and so on. Furthermore, the disk 845 may be a CD-ROM drive, a CD-R drive, a CD-RW drive, a DVD ROM, and so on. The memory 810 can store data 840 and/or a process 865, for example. The disk 850 and/or the memory 810 can store an operating system that controls and allocates resources of the computer 800.

The bus 820 may be a single internal bus interconnect architecture and/or other bus or mesh architectures. While a single bus is illustrated, it is to be appreciated that the computer 800 may communicate with various devices, log- ics, and peripherals using other busses (e.g., PCIE, 1394, USB, Ethernet). The bus 820 can be types including, for example, a memory bus, a memory controller, a peripheral bus, an external bus, a crossbar switch, and/or a local bus.

The computer 800 may interact with I/O devices via the I/O interfaces 855 and the I/O ports 860. Input/output devices may be, for example, a keyboard, a microphone, a pointing and selection device, cameras, video cards, displays, the network devices 845, the disk 850, and so on. The I/O ports 860 may include, for example, serial ports, parallel ports, and USB ports.

The computer 800 can operate in a network environment and thus may be connected to the network devices 845 via the I/O interfaces 855, and/or the I/O ports 860. Through the network devices 845, the computer 800 may interact with a network. Through the network, the computer 800 may be logically connected to remote computers. Networks with which the computer 800 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a computer-readable medium, a floppy disk, a flexible disk, a hard disk, a magnetic tape, other magnetic medium, an ASIC, a CD, other optical medium, a RAM, a ROM, a memory chip or card, a memory stick, and other media that can store instructions and/or data. Computer storage medium described herein are limited to statutory subject matter under 35 U.S.C § 101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"User", as used herein, includes but is not limited to one or more persons, software, computers or other devices, or combinations of these.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein is limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
   a communication logic which aggregates transaction data associated with a chargeable vehicle, and sends the aggregated transaction data to an authorizing entity, wherein the authorizing entity identifies a user associated with the chargeable vehicle by comparing the aggregated transaction data with previously stored authorizing data;
   an extrapolation logic which receives a list of possible charging stations based on proximity to the chargeable vehicle and identifies a charging station that supplied or is supplying the chargeable vehicle with a charge based, at least in part, on the aggregated transaction data and by a comparison of a received amount of charge by the chargeable vehicle to a dispensed amount of charge from each of the possible charging stations on the list, without receiving specific identification information from the identified charging station interacting with the chargeable vehicle; and
   an authorization logic which receives an authorization request from the authorizing entity to authorize a transaction between the chargeable vehicle and the identified charging station based on the aggregated transaction data and the previously stored authorizing data, and receives a confirmation via the user that the user has authority to affirm the transaction between the chargeable vehicle and the identified charging station; and in response to the confirmation by the user, sending a response to the authorization request, wherein the communication logic further confirms the charge from the identified charging station based, at least in part, on the response to the authorization request.

2. The system of claim 1, wherein the system is implemented in the chargeable vehicle, and wherein the communication logic communicates through a telematics network of the chargeable vehicle.

3. The system of claim 1, wherein the system is implemented a device, and wherein the communication logic communicates through a telematics network of the mobile device.

4. The system of claim 1, further comprising an identification logic which generates the list of possible charging stations based on user provided parameters.

5. The system of claim 4, wherein the identification logic comprises a Geo-Fence logic that generates the list of possible charging stations within specified geographic bounds.

6. The system of claim 1, wherein the aggregated transaction data further identifies the identified charging station identified by the extrapolation logic.

7. A system, comprising:
an identification logic which identifies a list of possible charging stations based on user provided parameters;
a communication logic which sends transaction data associated with a chargeable vehicle to an authorizing entity; wherein the authorizing entity identifies a user associated with the chargeable vehicle by comparing the transaction data with previously stored authorizing data;
an extrapolation logic which receives the list of possible charging stations based on proximity to the chargeable vehicle and identifies a charging station that supplied or is supplying the chargeable vehicle with a charge based, at least in part, on the aggregated transaction data and by a comparison of a received amount of charge by the chargeable vehicle to a dispensed amount of charge from each of the possible charging stations on the list, without receiving specific identification information from the identified charging station interacting with the chargeable vehicle; and
an authorization logic which receives an authorization request from the authorizing entity to authorize a transaction between the chargeable vehicle and an identified charging station based on the transaction data and the previously stored authorizing data; and receives a confirmation via the user that the user has authority to affirm the transaction between the chargeable vehicle and the identified charging station; and in response to the confirmation by the user sending a response to the authorization request,
wherein the communication logic is further configured to confirm the chargeable vehicle to receive the charge from the identified charging station based, at least in part, on the response to the authorization request.

8. The system of claim 7, wherein the system is implemented in the chargeable vehicle, and wherein the communication logic communicates through a telematics network of the chargeable vehicle.

9. The system of claim 7, wherein the system is implemented a device, and wherein the communication logic communicates telematics network of the mobile device.

10. The system of claim 7, wherein the identification logic:
generates the listing of possible charging stations, wherein the listing is visually represented as a map;
receives a selection of a charging station; and
generates driving directions from a position of the chargeable vehicle to the selected charging station.

11. The system of claim 7, wherein the identification logic comprises a Geo-Fence logic that generates the list of possible charging stations within specified geographic bounds.

12. The system of claim 11, wherein the Geo-Fence logic automatically reduces the specified geographic bounds in response to detecting proximity of the charging station.

13. A method for identifying a user of a charging station, the method comprising:
sending, by a processor, transaction data associated with a chargeable vehicle to an authorization entity, wherein the transaction data is associated with a user and the chargeable vehicle and the authorizing entity identifies the user associated with the chargeable vehicle by comparing the transaction data with previously stored authorizing data;
identifying, by a processor, a charging station from a list of possible charging stations based on proximity to the chargeable vehicle that supplied or is supplying the chargeable vehicle with a charge based, at least in part, on the transaction data and by a comparison of a received amount of charge by the chargeable vehicle to a dispensed amount of charge from each of the possible charging stations on the list, without receiving specific identification information from the identified charging station interacting with the chargeable vehicle;
receiving, by a processor, an authorization request to authorize the chargeable vehicle to be charged by the identified charging station;
receiving, by a processor, a confirmation via the user that the user has authority to affirm the transaction between the chargeable vehicle and the identified charging station;
sending, by a processor, in response to the confirmation by the user, a response to the authorization request; and
confirming, by a processor, charging of the chargeable vehicle from the identified charging station.

14. The method of claim 13, further comprising
generating the listing of possible charging stations, wherein the listing is visually represented as a map;
receiving a selection of a charging station; and
generating driving directions from a position of the chargeable vehicle to the selected charging station.

15. The method of claim 14, wherein the listing of possible charging stations is limited to the charging stations within a specified geographic bounds.

16. The method of claim 13, comprising, receiving confirmation from the authorization entity.

17. The method claim 16, wherein the confirmation is an invoice based on the amount of charge supplied to the chargeable vehicle.

18. The method of claim 16, wherein the confirmation includes information about the identified charging station supplying the chargeable vehicle.

19. The method of claim 16, wherein the user is identified when a specified number of values in the transaction data matches a number of values of the authorization data stored by the authorizing entity.

* * * * *